(12) United States Patent
Cigal et al.

(10) Patent No.: US 8,308,426 B2
(45) Date of Patent: Nov. 13, 2012

(54) SHAFT ASSEMBLY FOR A GAS TURBINE ENGINE

(75) Inventors: Brian P. Cigal, Windsor, CT (US); Mark A. Metzger, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 140 days.

(21) Appl. No.: 12/847,493

(22) Filed: Jul. 30, 2010

(65) Prior Publication Data
US 2012/0027570 A1 Feb. 2, 2012

(51) Int. Cl.
*F01D 25/18* (2006.01)
(52) U.S. Cl. ............... 415/111; 415/168.2; 415/175; 415/229; 384/475
(58) Field of Classification Search .......... 416/110–112, 416/168.1, 168.2, 175, 229; 384/99, 474, 384/475, 535, 564, 581, 585; 415/110–112, 415/168.1, 168.2, 175, 229
See application file for complete search history.

(56) References Cited

U.S. PATENT DOCUMENTS

| | | | |
|---|---|---|---|
| 3,285,004 A | 11/1966 | Hopley | |
| 4,384,749 A * | 5/1983 | Schaefer | 384/465 |
| 4,453,784 A | 6/1984 | Kildea et al. | |
| 4,707,152 A | 11/1987 | Neese | |
| 5,106,209 A * | 4/1992 | Atkinson et al. | 384/475 |
| 5,183,342 A * | 2/1993 | Daiber et al. | 384/475 |
| 6,131,914 A | 10/2000 | Proveaux | |
| 6,217,225 B1 | 4/2001 | Shimizu et al. | |
| 7,574,854 B2 | 8/2009 | Moniz | |
| 7,645,074 B2 | 1/2010 | Chiba et al. | |
| 2012/0027570 A1 * | 2/2012 | Cigal et al. | 415/110 |

FOREIGN PATENT DOCUMENTS

| | | | |
|---|---|---|---|
| GB | 961522 | | 6/1964 |
| JP | 2001012481 A | * | 1/2001 |
| JP | 2008240898 | | 10/2008 |
| JP | 2009030623 | | 2/2009 |

OTHER PUBLICATIONS

Flouros, Michael, "Correlations for Heat Generation and Outer Ring Temperature of High Speed and Highly Loaded Ball Bearings in an Aero-Engine", Aerospace Science and Technology, vol. 10, Sep. 18, 2006, pp. 611-617.

* cited by examiner

*Primary Examiner* — Edward Look
*Assistant Examiner* — Christopher R Legendre
(74) *Attorney, Agent, or Firm* — O'Shea Getz P.C.

(57) ABSTRACT

A shaft assembly for a gas turbine engine includes a shaft, an annular fluid collection cavity, and a bearing. The shaft is rotatable around an axially extending shaft centerline. The annular fluid collection cavity is formed by an axial panel extending between a forward radial panel and an aft radial panel. The aft radial panel includes a plurality of fluid apertures, each fluid aperture having a center disposed at a first radius from the shaft centerline. The bearing includes an inner race having a shaft mounting surface and a plurality of axially extending race fluid passages. The shaft mounting surface is engaged with an exterior surface of the shaft, and is disposed at a second radius from the shaft centerline, wherein the second radius is less than the first radius. At least some of the axially extending race fluid passages are fluidly connected with at least some of the fluid apertures in the aft radial panel.

17 Claims, 3 Drawing Sheets

SHAFT ASSEMBLY FOR A GAS TURBINE ENGINE

BACKGROUND OF THE INVENTION

1. Technical Field

This disclosure relates generally to a shaft assembly for a gas turbine engine.

2. Background Information

Most axial gas turbine engines include a high speed shaft extending between a high speed compressor section and a high speed turbine section, and a low speed shaft extending between a low speed compressor section and a low speed turbine section. The shafts extend axially and are rotatable about an axial centerline. The position of the shafts and peripheral elements surrounding the shafts are maintained by using bearings that not only permit the relative rotation, but also support loads transmitted within the engine. The cooling and lubrication of these bearings is of paramount importance to the operational ability and durability of the engine.

For performance reasons, it is desirable to increase the rotational speed of the shafts, and therefore the rotational speed of those bearing elements coupled with a shaft. Increasing the speed of the bearing, however, also increases the stress experienced by the bearing. Bearings are also subject to hoop stresses that increase as a function of diameter.

What is needed is a shaft assembly that enables a bearing to be sufficiently lubricated and cooled, one that can be utilized at higher speeds than most prior art engines, one that is configured to provide a favorable stress loading, and one that is readily manufacturable.

SUMMARY OF THE DISCLOSURE

According to a first aspect of the invention, a shaft assembly is provided for a gas turbine engine. The shaft assembly includes a shaft, an annular fluid collection cavity, and a bearing. The shaft is rotatable around an axially extending shaft centerline. The fluid collection cavity is formed by an axial panel extending between a forward radial panel and an aft radial panel. The aft radial panel includes a plurality of fluid apertures, each fluid aperture having a center disposed at a first radius from the shaft centerline. The bearing includes an inner race having a shaft mounting surface and a plurality of axially extending race fluid passages. The shaft mounting surface is engaged with an exterior surface of the shaft, and is disposed at a second radius from the shaft centerline, wherein the second radius is less than the first radius. At least some of the axially extending race fluid passages are fluidly connected with at least some of the fluid apertures in the aft radial panel.

According to a second aspect of the invention, a shaft assembly is provided for a gas turbine engine. The shaft assembly includes a shaft, an annular fluid collection cavity, a gear and a bearing. The shaft is rotatable around an axially extending shaft centerline. The fluid collection cavity is formed by an axial panel extending between a forward radial panel and an aft radial panel. The aft radial panel includes a plurality of fluid apertures, each fluid aperture having a center disposed at a first radius from the shaft centerline. The gear is mounted onto the shaft, aft of the aft radial panel. The gear includes a plurality of gear fluid passages that are fluidly connected to at least some of the fluid apertures in the aft radial panel. Each of the gear fluid passages extends axially along a gear passage centerline that is disposed at a second radius from the shaft centerline, wherein the second radius is greater than or equal to the first radius. The bearing includes an inner race having a shaft mounting surface and a plurality of axially extending race fluid passages. The shaft mounting surface is engaged with an exterior surface of the shaft, and disposed at a third radius from the shaft centerline, wherein the third radius is less than the second radius. The axially extending race fluid passages are fluidly connected to the gear fluid passages.

The foregoing features and the operation of the invention will become more apparent in light of the following description and the accompanying drawings.

DETAILED DESCRIPTION OF THE INVENTION

Figure 1:
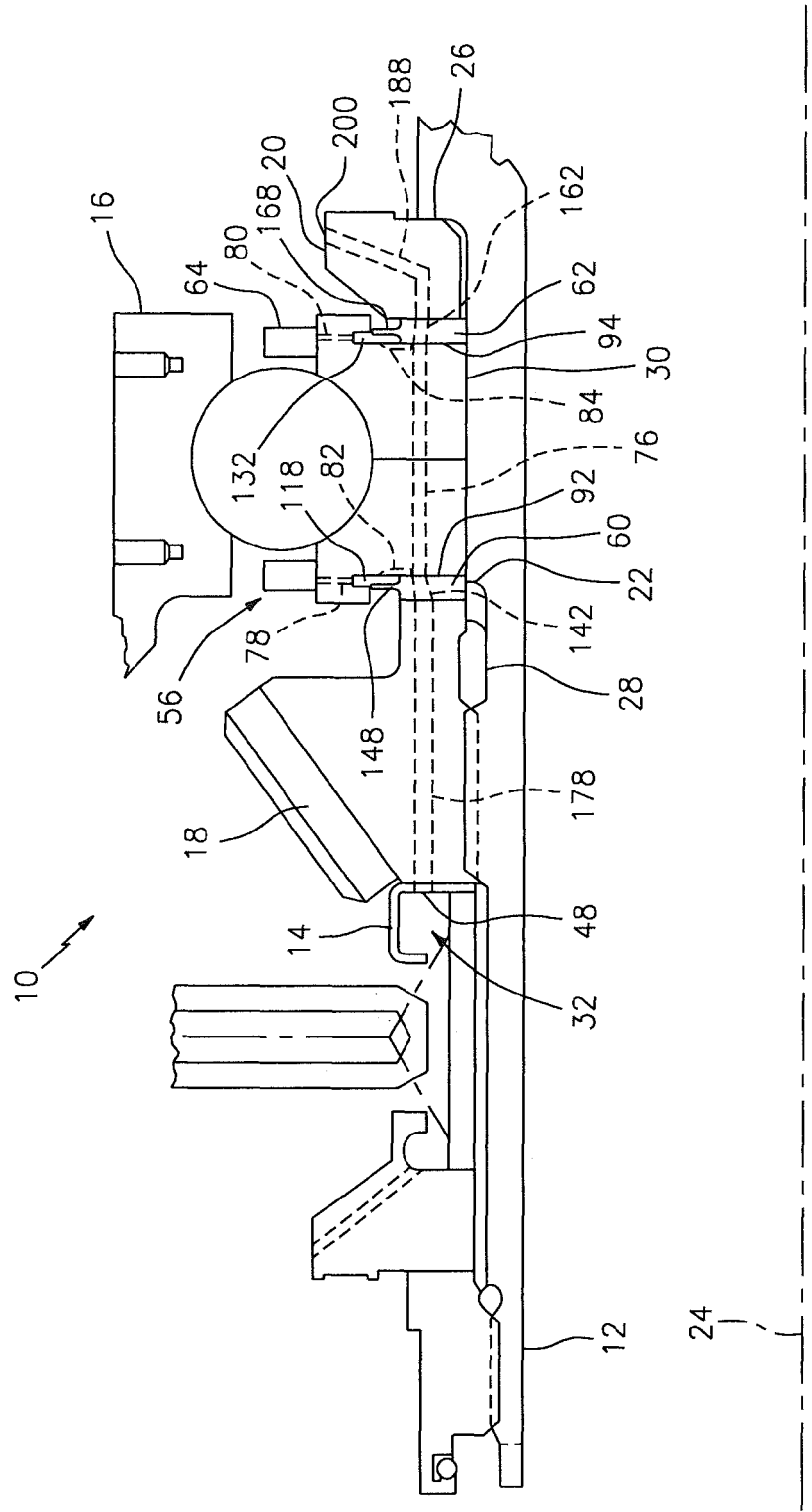
FIG. 1 is a top half, cross-sectional diagrammatic illustration of an exemplary shaft assembly that includes an annular fluid collector, a bearing, an annular gear and an annular seal plate.

Referring to FIG. 1, an exemplary embodiment of a shaft assembly 10 is shown for a high speed compressor section of a gas turbine engine having an axial centerline 24. The present invention, however, is not limited to high speed compressor shaft applications. In alternate embodiments, for example, the shaft assembly 10 can be adapted for other engine sections such as a low speed compressor section, a high or a low speed turbine section, etc. The shaft assembly 10 includes a compressor shaft 12, an annular fluid collector 14 and a bearing 16. In some embodiments, the shaft assembly 10 includes one or both of an annular gear 18 and an annular seal plate 20.

The compressor shaft 12 has an exterior mounting surface 22 (hereinafter "exterior surface") that extends axially to an aft shoulder 26. The exterior surface 22 includes a forward mounting surface 28 and an aft mounting surface 30. The aft mounting surface 30 is disposed between the forward mounting surface 28 and the aft shoulder 26.

Figure 2:
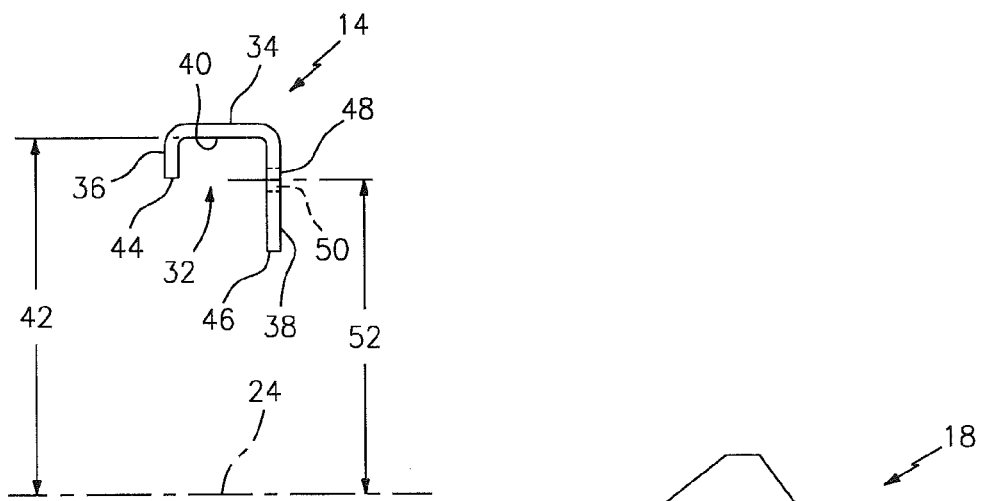
FIG. 2 is an enlarged diagrammatic illustration of the fluid collector in FIG. 1.

Referring to FIG. 2, the fluid collector 14 (also sometimes referred to as an "axial scoop") is disposed for rotation about the engine centerline 24. The fluid collector 14 includes an annular fluid collection cavity 32 formed by an axial panel 34, a forward radial panel 36 and an aft radial panel 38. The axial panel 34 extends, for example, substantially parallel to the centerline between the forward radial panel 36 and the aft radial panel 38. The axial panel 34 includes an inner cavity surface 40 disposed at a radius 42 (hereinafter "IC radius") from the centerline 24. The forward radial panel 36 extends radially inward from the axial panel 34 to a collector tip 44. The aft radial panel 38 extends radially inward from the axial panel 34 to a shaft mounting surface 46. The aft radial panel 38 includes a plurality of circumferentially disposed fluid apertures 48 (e.g., holes, slots, etc.). Each fluid aperture 48 has a center 50 disposed at a radius 52 (hereinafter "FA radius") from the centerline 24. The FA radius 52 is less than the IC radius 42.

Figure 3:
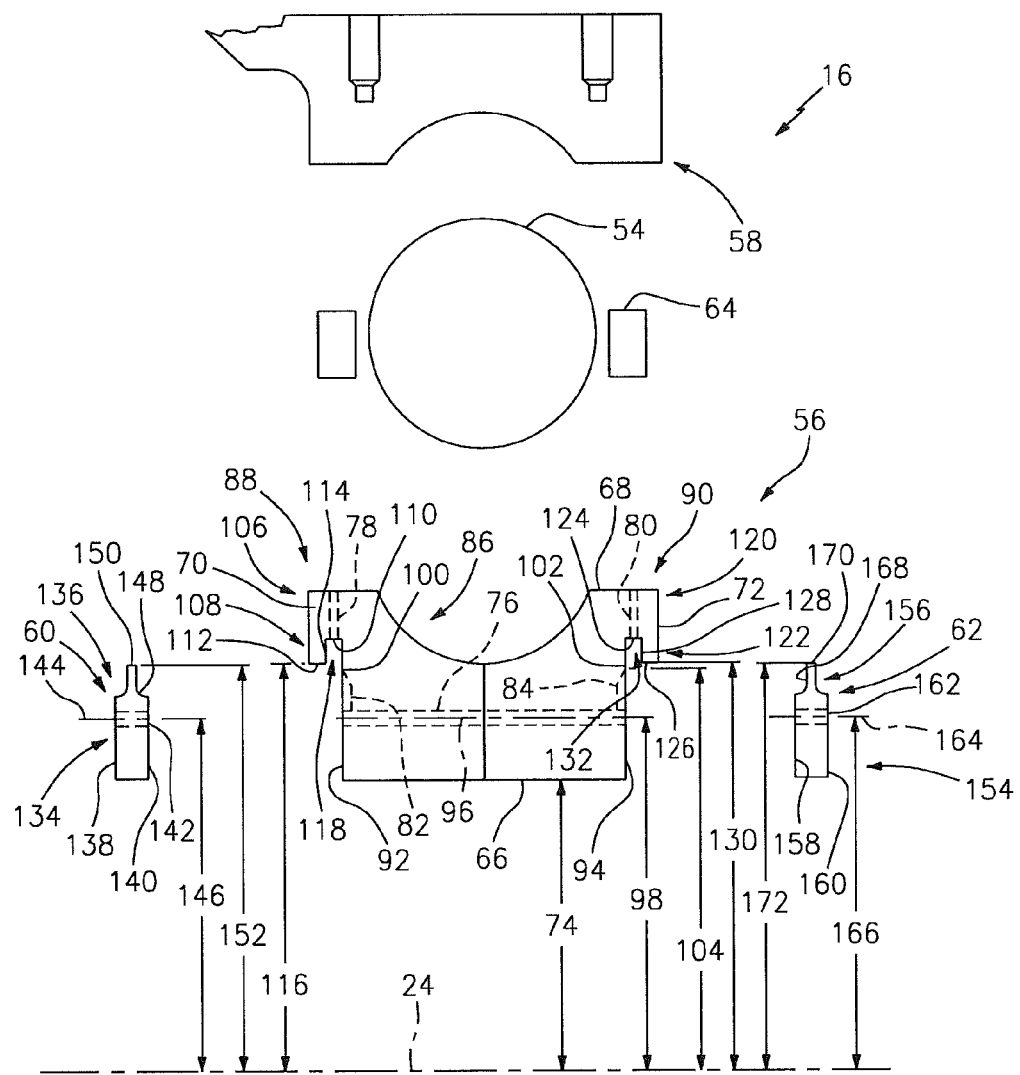
FIG. 3 is an enlarged exploded diagrammatic illustration of the bearing in FIG. 1.

Referring to FIG. 3, an exemplary embodiment of the bearing 16 is shown as a rolling-element bearing. Such a rolling-element bearing can be configured as a ball bearing, a roller bearing, a needle bearing, a tapered roller bearing, a spherical roller bearing, a thrust bearing, etc. The bearing 16 is centered on the centerline 24, and includes a plurality of rolling elements 54 disposed between an inner race 56 and an outer race 58. The bearing 16 can further include an annular forward baffle 60 and/or an annular aft baffle 62.

The rolling elements 54 are circumferentially aligned, and discretely located within a cage 64.

The inner race 56 extends radially between a shaft mounting surface 66 and an outer radial race surface 68. The inner race 56 extends axially between a forward race surface 70 and an aft race surface 72. The shaft mounting surface 66 is disposed at a radius 74 (hereinafter "SMS radius") from the centerline 24. The SMS radius 74 is less than the FA radius 52 (see FIG. 2). The inner race 56 includes a plurality of fluid passages 76, 78, 80 and/or channels 82, 84 configured to provide fluid passages through the inner race 56.

In the specific embodiment shown in FIG. 3, the inner race 56 is shown as a split ring, having two axial halves. In other embodiments, the inner race may be a unitary structure. The inner race 56 includes an annular base segment 86 disposed axially between an annular forward flanged protrusion 88 and an annular aft flanged protrusion 90. The base segment 86 extends radially between the shaft mounting surface 66 and the outer radial race surface 68. The base segment 86 extends axially between a forward end 92 and an aft end 94. The base segment 86 includes a plurality of circumferentially disposed axial fluid passages 76 and a plurality of circumferentially disposed radial channels 82, 84. Each axial fluid passage 76 extends along a race passage centerline 96 between the forward and the aft ends 92, 94 of the base segment 86. Each race passage centerline 96 is disposed at a radius 98 (hereinafter "RP radius") from the centerline 24. The RP radius 98 is greater than or equal to the FA radius 52 (see FIG. 2). The radial channels 82, 84 can be disposed in the forward and/or the aft ends 92, 94 of the base segment 86. Each radial channel 82, 84 is fluidly connected to a respective one of the axial fluid passages 76. Each radial channel 82, 84 extends radially outwards from the respective axial fluid passage 76 to an outer channel end 100, 102. The outer channel end 100, 102 is disposed at a radius 104 (hereinafter "OCE radius") from the centerline 24.

The forward flanged protrusion 88 includes an intermediate segment 106 and a flange segment 108. The intermediate segment 106 extends axially forward from the base segment 86 to the forward race surface 70. The intermediate segment 106 extends radially inward from the outer radial race surface 68 to an axially extending channel surface 110. The intermediate segment 106 includes a plurality of circumferentially disposed radial fluid passages 78. Each radial fluid passage 78 extends from the axially extending channel surface 110 to the outer radial race surface 68. The flange segment 108 extends radially inward from the intermediate segment 106 to a flange tip 112. The flange segment 108 extends axially aft from the forward race surface 70 to a radially extending channel surface 114. The flange tip 112 is disposed at a radius 116 (hereinafter "FFT radius") from the centerline 24. In the embodiment shown in FIG. 3, the FFT radius 116 is greater than or equal to the OCE radius 104. The radially extending channel surface 114 is disposed a distance from the forward end 92 of the base segment 86, thereby forming a forward annular channel 118 between the flange segment 108 and the base segment 86. In some embodiments, the radially extending channel surface 114 is adapted as a grip for disassembling the split ring inner race 56.

The aft flanged protrusion 90 includes an intermediate segment 120 and a flange segment 122. The intermediate segment 120 extends axially aft from the base segment 86 to the aft race surface 72. The intermediate segment 120 extends radially inward from the outer radial race surface 68 to an axially extending channel surface 124. The intermediate segment 120 includes a plurality of circumferentially disposed radial fluid passages 80. Each radial fluid passage 80 extends from the axially extending channel surface 124 to the outer radial race surface 68. The flange segment 122 extends radially inward from the intermediate segment 120 to a flange tip 126. The flange segment 122 extends axially forward from the aft race surface 72 to a radially extending channel surface 128. The flange tip 126 is disposed at a radius 130 (hereinafter "AFT radius") from the centerline 24. The AFT radius 130 is greater than or equal to the OCE radius 104. The radially extending channel surface 128 is disposed a distance from the aft end of the base segment 86, thereby forming an aft annular channel 132 between the flange segment 122 and the base segment 86. In some embodiments, the radially extending channel surface 128 is adapted as a grip for disassembling the split ring inner race 56.

Referring to FIGS. 1 and 3, the forward baffle 60 is disposed adjacent to the forward end 92 of the inner race 56. The forward baffle 60 includes a base segment 134 and a fluid guide segment 136. The base segment 134 extends axially from a forward surface 138 to an aft surface 140. The base segment 134 includes a plurality of circumferentially disposed axial fluid passages 142. Each axial fluid passage 142 extends along a baffle passage centerline 144 between the forward and the aft ends 138, 140 of the base segment 134. Each baffle passage centerline 144 is disposed at a radius 146 (hereinafter "FBP radius") from the centerline 24. The FBP radius 146 is greater than or equal to the FA radius 52 (see FIG. 2). The FBP radius 146 is also less than or equal to the RP radius 98. The fluid guide segment 136 has a sloped guiding surface 148 that extends radially outward from the base segment 134 to a baffle tip 150. The baffle tip 150 is disposed at a radius 152 (hereinafter "FBT radius") from the centerline 24. The FBT radius 152 is sized equal to or less than the FFT radius 116.

The aft baffle 62 is disposed adjacent to the aft end 94 of the inner race 56. The aft baffle 62 includes a base segment 154 and a fluid guide segment 156. The base segment 154 extends axially from a forward end 158 to an aft end 160. The base segment 154 includes a plurality of circumferentially disposed axial fluid passages 162. Each axial fluid passage 162 extends along a baffle passage centerline 164 between the forward and the aft ends 158, 160 of the base segment 154. Each baffle passage centerline 164 is disposed at a radius 166 (hereinafter "ABP radius") from the centerline 24. The ABP radius 166 is greater than or equal to the FA radius 52 (see FIG. 2). The ABP radius 166 is also greater than or equal to the RP radius 98. The fluid guide segment 156 has a sloped guiding surface 168 that extends radially outward from the base segment 154 to a baffle tip 170. The baffle tip 170 is disposed at a radius 172 (hereinafter "ABT radius") from the centerline 24. The ABT radius 172 is sized equal to or less than the AFT radius 130.

Figure 4:
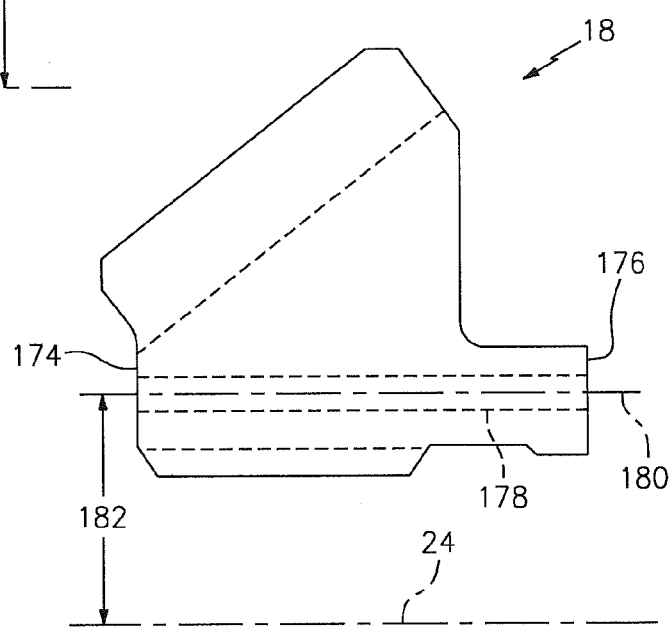
FIG. 4 is an enlarged diagrammatic illustration of the gear in FIG. 1.

Referring to FIG. 4, an exemplary embodiment of the gear 18 is shown as a bevel gear. The present invention, however, is not limited to any particular gear configuration. The gear 18 extends axially along the centerline 24 between a forward end 174 and an aft end 176. The gear 18 includes a plurality of circumferentially disposed axial fluid passages 178. Each axial fluid passage 178 extends along a gear passage centerline 180 between the forward and the aft ends 174, 176 of the gear 18. Each gear passage centerline 180 is disposed at a radius 182 (hereinafter "GP radius") from the centerline 24.

The GP radius 182 is greater than or equal to the FA radius 52 (see FIG. 2). The GP radius 182 is also less than or equal to the FBP radius 146 (see FIG. 3).

Figure 5:
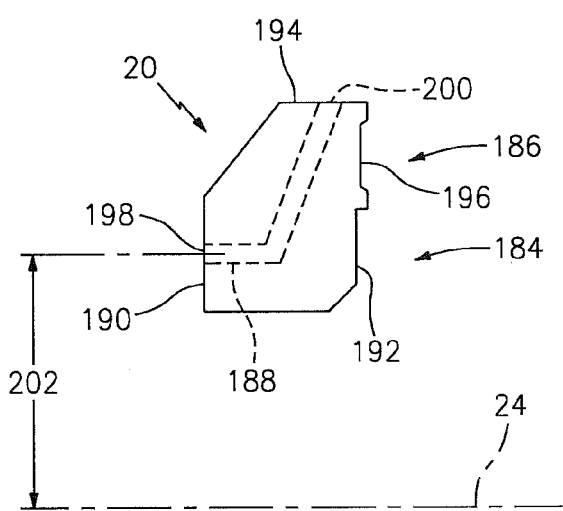
FIG. 5 is an enlarged diagrammatic illustration of the seal plate in FIG. 1.

Referring to FIG. 5, the seal plate 20 extends axially along the centerline 24, and includes a base segment 184, a seal segment 186 and a plurality of circumferentially disposed fluid passages 188. The base segment 184 extends axially from a forward end 190 to an aft end 192. The seal segment 186 extends radially from the base segment 184 to an outer radial plate surface 194. The seal segment 186 extends axially from the forward end 190 of the base segment 184 to an aft seal surface 196. Each fluid passage 188 extends from an inlet 198 disposed in the forward end 190 of the base segment 184 to an outlet 200 disposed in the outer radial plate surface 194. The inlet 198 has a center that is disposed at a radius 202 (hereinafter "SPI radius") from the centerline 24. The SPI radius 202 is equal to or greater than the ABP radius 166.

Referring again to FIG. 1, the gear 18, bearing 16, and seal plate 20 are sequentially disposed between the fluid collector 14 and aft shoulder 26 of the compressor shaft 12. The fluid collector 14, gear 18, bearing 16, and seal plate 20 are aligned such that during operation of the engine fluid flows from the fluid apertures 48 in the fluid collector 14, through the axial fluid passages 178, 142, 76, 162 in the gear 18, forward baffle 60, bearing 16, and aft baffle 62, respectively, to the fluid passages 188 in the seal plate 20. The fluid collector 14 and the gear 18 are mounted to the forward mounting surface 28 of the compressor shaft 12. The bearing 16 and the seal plate 20 are mounted to the aft mounting surface 30 of the compressor shaft 12.

During operation, the compressor shaft 12 rotates about the centerline 24. Centrifugal force induced by the rotation of the compressor shaft 12 is utilized to direct fluid, such as engine oil, through the various fluid passages 178, 142, 76, 162, 188 and/or channels 82, 84 in the shaft assembly 10. In the embodiment in FIG. 1, for example, a pool of the fluid is collected in the fluid collection cavity 32. The pooled fluid is directed from the fluid collection cavity 32, through the fluid apertures 48 in the fluid collector 14 and the axial fluid passages 178, 142 in the gear 18 and in the forward baffle 60, to the axial fluid passages 76 in the inner race 56. A quantity of the fluid in the axial fluid passages 76 in the inner race 56 is directed, through the radial channels 82, 84 in the inner race 56, towards the forward and the aft annular channels 118, 132. The sloped guiding surfaces 148, 168 of the forward and the aft baffles 60 and 62 ensure that substantially all of the fluid direct through the radial channels 82, 84 pools in the forward and the aft annular channels 118, 132. The pooled fluid is directed towards the bearing cage 64 through the radial fluid passages 78, 80 in the inner race 56. The remaining quantity of the fluid in the axial fluid passages 76 in the inner race 56 is directed, through the axial fluid passages 162 in the aft baffle 62, to the fluid passages 188 in the seal plate 20. The fluid in the fluid passages 188 in the seal plate 20 can be expelled from the shaft assembly 10 through the seal plate outlets 200.

While various embodiments of the present invention have been disclosed, it will be apparent to those of ordinary skill in the art that many more embodiments and implementations are possible within the scope of the invention. For example, one or more of the axial fluid passages can be sloped to axially diverge from the compressor shaft as they extend aft. Accordingly, the present invention is not to be restricted except in light of the attached claims and their equivalents.

What is claimed is:

1. A shaft assembly for a gas turbine engine, comprising: a shaft rotatable around an axially extending shaft centerline; an annular fluid collection cavity formed by an axial panel extending between a forward radial panel and an aft radial panel, which aft radial panel includes a plurality of fluid apertures, each fluid aperture having a center disposed at a first radius from the shaft centerline; and a bearing including an inner race having a shaft mounting surface and a plurality of axially extending race fluid passages, which shaft mounting surface is engaged with an exterior surface of the shaft and is disposed at a second radius from the shaft centerline, and which second radius is less than the first radius, wherein at least some of the axially extending race fluid passages are fluidly connected with at least some of the fluid apertures in the aft radial panel; and further comprising an annular seal plate mounted onto the shaft adjacent to and aft of the bearing, which seal plate includes a plurality of seal plate fluid passages fluidly connected to at least some of the axially extending race fluid passages.

2. The shaft assembly of claim 1, wherein the inner race further includes a plurality of radially extending race fluid passages that are fluidly connected to the axially extending race fluid passages, each of which radially extending race fluid passages extends to an outer radial surface of the inner race.

3. The shaft assembly of claim 1, wherein the bearing is adapted as one of a ball bearing, a roller bearing, a needle bearing, a tapered roller bearing, a spherical roller bearing and a thrust bearing.

4. A shaft assembly for a as turbine engine, comprising:
   a shaft rotatable around an axially extending shaft centerline;
   an annular fluid collection cavity formed by an axial panel extending between a forward radial panel and an aft radial panel, which aft radial panel includes a plurality of fluid apertures, each fluid aperture having a center disposed at a first radius from the shaft centerline; and
   a bearing including an inner race having a shaft mounting surface and a plurality of axially extending race fluid passages, which shaft mounting surface is engaged with an exterior surface of the shaft and is disposed at a second radius from the shaft centerline, and which second radius is less than the first radius, wherein at least some of the axially extending race fluid passages are fluidly connected with at least some of the fluid apertures in the aft radial panel;
   wherein the inner race further includes a base segment, a first flanged protrusion and a plurality of radially extending race fluid passages, which first flanged protrusion extends axially from the base segment, and which radially extending race fluid passages are fluidly connected to the axially extending race fluid passages, wherein at least some of the radially extending race fluid passages extend through the first flanged protrusion to an outer radial surface of the inner race.

5. The shaft assembly of claim 4, wherein
   an annular channel is formed between a flange segment of the first flanged protrusion and the base segment; and
   the at least some of the radially extending race fluid passages are fluidly connected to the annular channel.

6. The shaft assembly of claim 5, wherein the base segment further includes a plurality of radially extending channels that fluidly connect the at least some of the axially extending race fluid passages to the annular channel.

7. The shaft assembly of claim 4, wherein the bearing further includes an annular baffle having a sloped fluid guiding surface positioned to direct a quantity of fluid from at least some of the axially extending race fluid passages to at least some of the radially extending race fluid passages.

8. The shaft assembly of claim 4, wherein
the inner race further includes a second flanged protrusion that extends axially from the base segment opposite the first flanged protrusion; and
at least some of the radially extending race fluid passages extend through the second flanged protrusion to the outer radial surface of the inner race.

9. The shaft assembly of claim 8, wherein the bearing further includes first and second annular baffles, each annular baffle having a sloped fluid guiding surface positioned to direct fluid from respective axially extending race fluid passages to respective radially extending race fluid passages.

10. A shaft assembly for a gas turbine engine, comprising:
a shaft rotatable around an axially extending shaft centerline;
an annular fluid collection cavity formed by an axial panel extending between a forward radial panel and an aft radial panel, which aft radial panel includes a plurality of fluid apertures, each fluid aperture having a center disposed at a first radius from the shaft centerline;
a bearing including an inner race having a shaft mounting surface and a plurality of axially extending race fluid passages, which shaft mounting surface is engaged with an exterior surface of the shaft and is disposed at a second radius from the shaft centerline, and which second radius is less than the first radius, wherein at least some of the axially extending race fluid passages are fluidly connected with at least some of the fluid apertures in the aft radial panel; and
a gear mounted onto the shaft between the aft radial panel and the bearing, which gear includes a plurality of gear fluid passages that fluidly connect at least some of the fluid apertures in the aft radial panel to at least some of the axially extending race fluid passages, each of which gear fluid passages extends axially along a gear passage centerline that is disposed at a third radius from the shaft centerline, and which third radius is greater than the second radius.

11. A shaft assembly for a gas turbine engine, comprising:
a shaft rotatable around an axially extending shaft centerline;
an annular fluid collection cavity formed by an axial panel extending between a forward radial panel and an aft radial panel, which aft radial panel includes a plurality of fluid apertures, each fluid aperture having a center disposed at a first radius from the shaft centerline;
a gear mounted onto the shaft, aft of the aft radial panel, which gear includes a plurality of gear fluid passages that are fluidly connected to at least some of the fluid apertures in the aft radial panel, each of which gear fluid passages extends axially along a gear passage centerline that is disposed at a second radius from the shaft centerline, and which second radius is greater than or equal to the first radius; and
a bearing including an inner race having a shaft mounting surface and a plurality of axially extending race fluid passages, which shaft mounting surface is engaged with an exterior surface of the shaft, and disposed at a third radius from the shaft centerline, which third radius is less than the second radius, and which axially extending race fluid passages are fluidly connected to the gear fluid passages.

12. The shaft assembly of claim 11, wherein the inner race further includes a base segment, a first flanged protrusion and a plurality of radially extending race fluid passages, which first flanged protrusion extends axially from the base segment, and which radially extending race fluid passages are fluidly connected to the axially extending race fluid passages, wherein at least some of the radially extending race fluid passages extend through the first flanged protrusion to an outer radial surface of the inner race.

13. The shaft assembly of claim 12, wherein
an annular channel is formed between a flange segment of the first flanged protrusion and the base segment; and
the at least some of the radially extending race fluid passages are fluidly connected to the annular channel.

14. The shaft assembly of claim 13, wherein the base segment further includes a plurality of radially extending channels that fluidly connect the at least some of the axially extending race fluid passages to the annular channel.

15. The shaft assembly of claim 13, wherein the bearing further includes an annular baffle having a sloped fluid guiding surface positioned to direct a quantity of fluid from the at least some of the axially extending race fluid passages to the annular channel.

16. The shaft assembly of claim 12, wherein
the inner race further includes a second flanged protrusion that extends axially from the base segment opposite the first flanged protrusion; and
at least some of the radially extending race fluid passages extend through the second flanged protrusion to the outer radial surface of the inner race.

17. The shaft assembly of claim 16, wherein the bearing further includes first and second annular baffles, each annular baffle having a sloped fluid guiding surface positioned to direct fluid from respective axially extending race fluid passages to respective radially extending race fluid passages.

* * * * *